(12) United States Patent
Rolion et al.

(10) Patent No.: US 11,660,904 B2
(45) Date of Patent: May 30, 2023

(54) DEVICE FOR MIXING INKS, ASSEMBLY COMPRISING THE DEVICE AND THE METHOD FOR USING SAME

(71) Applicant: SOCIETE BIC, Clichy (FR)

(72) Inventors: Franck Rolion, Asnieres-sur-Oise (FR); Etienne Roudaut, La Garenne Colombes (FR)

(73) Assignee: SOCIÉTÉ BIC, Clichy (FR)

( * ) Notice: Subject to any disclaimer, the term of this patent is extended or adjusted under 35 U.S.C. 154(b) by 405 days.

(21) Appl. No.: 16/652,743

(22) PCT Filed: Oct. 16, 2018

(86) PCT No.: PCT/FR2018/052574
§ 371 (c)(1),
(2) Date: Apr. 1, 2020

(87) PCT Pub. No.: WO2019/077262
PCT Pub. Date: Apr. 25, 2019

(65) Prior Publication Data
US 2020/0238748 A1 Jul. 30, 2020

(30) Foreign Application Priority Data
Oct. 18, 2017 (FR) ...................................... 1759758

(51) Int. Cl.
*B43K 11/00* (2006.01)
*B65B 3/04* (2006.01)
(Continued)

(52) U.S. Cl.
CPC ................ *B43K 11/00* (2013.01); *B65B 3/04* (2013.01); *B67C 3/264* (2013.01); *B67C 3/2637* (2013.01); *C09D 11/16* (2013.01)

(58) Field of Classification Search
CPC ......... B67C 3/264; B67C 3/2637; B65B 3/04; B43K 11/00
(Continued)

(56) References Cited

U.S. PATENT DOCUMENTS 4,464,668 A * 8/1984 Komai .................. B41J 2/18
347/89
5,132,740 A * 7/1992 Okamoto ............... G03G 21/12
141/351
(Continued)

FOREIGN PATENT DOCUMENTS

EP 0 137 171 A2 4/1985
GB 1 346 903 2/1974
(Continued)

OTHER PUBLICATIONS

International Search Report and Written Opinion dated Feb. 12, 2019, in International Application No. PCT/FR2018/052574 (10 pages).

*Primary Examiner* — Timothy L Maust
(74) *Attorney, Agent, or Firm* — Bookoff McAndrews, PLLC

(57) ABSTRACT

A device for filling cartridges for a writing implement, the device including at least two separate connectors, a system for metering inks and a system for filling a cartridge, each connector being configured to connect a reservoir containing an ink to the cartridge. The invention also concerns an assembly comprising a device as previously defined and a plurality of ink reservoirs, each ink reservoir being connected to a connector of the device and a method for filling a cartridge using such an assembly.

17 Claims, 2 Drawing Sheets

(51) Int. Cl.
*B67C 3/26* (2006.01)
*C09D 11/16* (2014.01)

(58) Field of Classification Search
USPC .................................... 141/237, 351, 352
See application file for complete search history.

(56) References Cited

U.S. PATENT DOCUMENTS

| | | | | |
|---|---|---|---|---|
| 5,479,968 | A * | 1/1996 | Sanchez | B41J 2/17506 141/2 |
| 5,546,996 | A * | 8/1996 | Broyles | A61C 5/64 141/237 |
| 5,934,344 | A * | 8/1999 | Wainberg | B01F 33/84 222/164 |
| 6,065,828 | A * | 5/2000 | Lo | B01F 31/42 347/85 |
| 7,963,954 | B2 * | 6/2011 | Kavazov | A61J 1/2096 141/330 |
| 8,176,950 | B2 * | 5/2012 | Luchinger | G01F 11/00 141/83 |
| 8,444,242 | B2 * | 5/2013 | Hyakudome | B41J 2/17506 347/85 |
| 9,193,212 | B2 * | 11/2015 | Henry | B43K 15/00 |
| 2001/0052370 | A1 * | 12/2001 | Shinada | B41J 2/17523 141/2 |
| 2006/0283521 | A1 * | 12/2006 | Bartholomew | B01F 31/60 141/104 |
| 2011/0017773 | A1 * | 1/2011 | Luehrsen | B01F 35/714 222/1 |
| 2013/0078025 | A1 * | 3/2013 | Turgeman | B43K 5/12 401/258 |
| 2013/0319577 | A1 * | 12/2013 | Kavazov | A61J 1/20 141/2 |
| 2014/0223720 | A1 | 8/2014 | Henry et al. | |
| 2014/0373968 | A1 * | 12/2014 | Mueller | A61J 1/22 141/95 |

FOREIGN PATENT DOCUMENTS

| | | | | |
|---|---|---|---|---|
| JP | H09202091 | A * | 8/1997 | |
| JP | 2008132779 | A | 6/2008 | |
| KR | 20180007975 | A * | 1/2018 | ............ B43K 31/00 |

* cited by examiner

DEVICE FOR MIXING INKS, ASSEMBLY COMPRISING THE DEVICE AND THE METHOD FOR USING SAME

CROSS REFENCE TO RELATED APPLICATION(S)

This application is a National Stage Application of International Application No. PCT/FR2018/052574, filed on Oct. 16, 2018, now published as WO2019/077262 and which claims priority to French Application No. FR1759758.

BACKGROUND

The present disclosure relates to a device for filling cartridges for a writing implement, such as a fountain pen, a ball-point pen or any other writing implement delivering a liquid ink.

In these types of writing implements comprising an ink cartridge that is replaced by the user when the ink cartridge is empty, the choice of colors is limited by the colors offered by the ink cartridge manufacturers.

Moreover, when the ink cartridge is used, it must be used until it is finished and/or the ink cartridge is thrown away when one wishes to change the color of the ink, that is to say when one wishes to change the ink cartridge in the writing implement.

SUMMARY

This disclosure aims to overcome these drawbacks, at least in part.

To this end, the disclosure refers to a device for filling cartridges for a writing implement, the device including at least two separate connectors, a system for metering inks and a system for filling a cartridge, each connector being configured to connect a reservoir containing an ink to the cartridge.

The writing implement is a manual writing implement, such as a fountain pen, a ball-point pen or any other writing implement delivering a liquid ink.

Ink means an ink that can be used directly by the user and can be mixed with other inks, that is to say other inks that can be used directly by the user, in order to obtain a mixture of inks. It will be understood that the inks mixed with one another have different colors or shades.

It will be understood that when the ink reservoir is connected to the connector, the ink contained in the ink reservoir can flow through the device and reach the cartridge by passing into the metering system and into the filling system.

The metering system is configured to draw off a volume of ink from each ink reservoir connected to the device. It will be understood that the metering system cannot draw a volume of ink from all of the ink reservoirs connected to the device, which means that at least one of the volumes of ink drawn can be equal to zero.

The filling system is configured to fill the cartridge with the volumes of ink drawn from the ink reservoirs by the metering system. The mixing of inks is thus performed directly in the cartridge. It is not therefore necessary to rinse the device if one wishes to fill a cartridge with a different mixture of inks.

A cartridge means a reservoir configured to be inserted into a writing implement and containing an ink that is used by the writing implement. The cartridge can be replaced when it is empty or it can be refilled with ink.

A cartridge can thus be filled with a mixture of inks without the need to handle the inks. In fact, when the ink reservoirs are connected to the device, since the ink volumes are drawn off by the metering system and sent into the cartridge by the filling system, the user does not need to handle the ink reservoirs.

In some embodiments, the metering system comprises a metering element for each ink reservoir.

The metering element can for example be a piston with an actuator, a piezoelectric injection head, a thermal injection head or a solenoid valve.

In some embodiments, each connector comprises an inlet shutter that can assume an open configuration or a closed configuration of the connector.

Thus, when an ink reservoir is not connected to the connector, the inlet shutter closes the connector and the ink circuit in the device is not in communication with the outside. It is thus possible to prevent the ink contained in the device from drying out or at least reduce the speed at which the ink dries out in the device when the ink reservoir is not connected to the connector.

In some embodiments, the device comprises one actuator for each inlet shutter, so that the inlet shutter automatically passes from the open configuration to the closed configuration of the connector on disconnection of an ink reservoir from the connector.

Thus, the user need perform no specific action for the inlet shutter to pass from one configuration to the other. On connection of an ink reservoir to the device, that is to say on insertion of an ink reservoir into the connector of the device, the inlet shutter automatically passes from the closed configuration to the open configuration of the connector by the simple fact of inserting the ink reservoir into the connector of the device. Similarly, when the user removes, that is to say disconnects, the ink reservoir from the connector of the device, the inlet shutter automatically passes from the open configuration to the closed configuration of the connector by the simple fact of withdrawing the ink reservoir from the connector of the device.

In some embodiments, the device comprises three connectors.

For example, when the device is configured to operate with cyan, yellow and magenta reservoirs.

In some embodiments, the device comprises four connectors.

For example, when the device is configured to operate with cyan, yellow, magenta and black reservoirs.

In some embodiments, the device comprises five connectors.

For example, when the device is configured to operate with cyan, yellow, magenta, black reservoirs and a fifth ink. The fifth ink can be transparent or white.

In some embodiments, the filling system comprises an outlet shutter that can assume an open configuration or a closed configuration of the filling system.

Thus, when the device is not in use and/or a cartridge is not connected to the device, the outlet shutter closes the filling system and the ink circuit in the device is not in communication with the outside. It is thus possible to prevent the ink contained in the device from drying out or at least reduce the speed at which the ink dries out in the device when a cartridge is not connected to the device.

In some embodiments, the device comprises an actuator of the outlet shutter, so that the outlet shutter passes automatically from the closed configuration to the open configuration of the filling system when a cartridge is connected to the filling system and the outlet shutter passes automatically from the open configuration to the closed configuration of the filling system when a cartridge is disconnected from the filling system.

Thus, the user need perform no specific action for the outlet shutter to pass from one configuration to the other. On connection of a cartridge to the filling system, that is to say on insertion of a cartridge into the device, the outlet shutter automatically passes from the closed configuration to the open configuration of the filling system by the simple fact of inserting the cartridge into the device. Similarly when the user removes, that is to say disconnects, the cartridge from the filling system of the device, the outlet shutter automatically passes from the open configuration to the closed configuration of the filling system by the simple fact of withdrawing the cartridge from the device.

In some embodiments, the filling system comprises a mixer.

For example, the filling system can comprise a mixer configured to transmit mechanical vibrations to the cartridge and/or to agitate the cartridge. Other methods of mixing can also be envisaged.

The present disclosure also refers to an assembly comprising a device as previously defined and a plurality of ink reservoirs, each ink reservoir being connected to a connector of the device.

In some embodiments, the assembly is configured to fill an empty cartridge with a mixture of inks, the cartridge having a volume greater than or equal to 0.50 mL (milliliters), preferably greater than or equal to 0.75 mL and less than or equal to 5 mL, preferably less than or equal to 3 mL.

In some embodiments, the inks are aqueous inks.

The ink usually comprises a dye and a solvent. The ink may also comprise a binder and/or additives. Aqueous ink means an ink of which the solvent is water and in which the dye is dissolved. These inks are inks that limit the evaporation of the inks and the mixture of inks obtained. Moreover, these inks have viscosities close to the viscosity of water at 20° C., that is to say around 1 mPa·s (millipascal second) and can mix easily with one another.

The present disclosure also refers to a method for filling a cartridge for a writing implement in an assembly such as that previously described, the method comprising the following steps:

metering by the metering system the inks contained in each reservoir by drawing off a volume of ink from each reservoir;
filling by the filling system the cartridge with the volumes of ink drawn off.

In some embodiments, after filling the cartridge, a cap is fitted to the cartridge to seal the cartridge.

It will be understood that the cap limits the evaporation of the inks contained in the cartridge. The cap can be fitted onto the cartridge just after filling the cartridge and removing the cartridge from the device, for example in order to store the cartridge prior to its use.

Similarly, when part of the mixture of inks contained in the cartridge has been used, one may wish to use another cartridge containing another mixture of inks. The cartridge is then removed from the writing implement and a cap is fitted onto the cartridge, ready for storage until it is next used.

BRIEF DESCRIPTION OF THE DRAWINGS

Further features of the disclosure will emerge from the following description of embodiments, given by way of non-limiting examples, with reference to the accompanying Figures, in which.

DETAILED DESCRIPTION OF EMBODIMENTS

Figure 1:
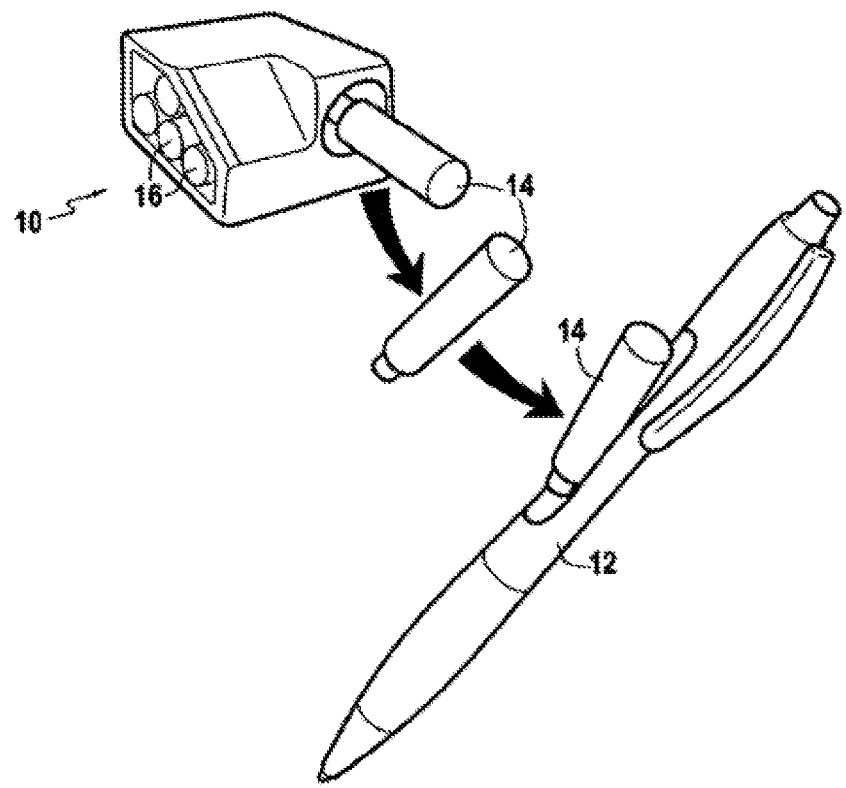
FIG. 1 is a schematic representation of an assembly according to an example.

FIG. 1 shows an assembly of a device 10 for filling cartridges 14 for a manual writing implement, such as a ball-point pen 12, and a plurality of ink reservoirs 16. The embodiment in FIG. 1 comprises four ink reservoirs 16.

The ball-point pen 12 operates with one ink cartridge 14 that is inserted into the ball-point pen 12. The writing instrument could be a fountain pen or any other writing implement operating with an ink cartridge 14.

Figure 2:
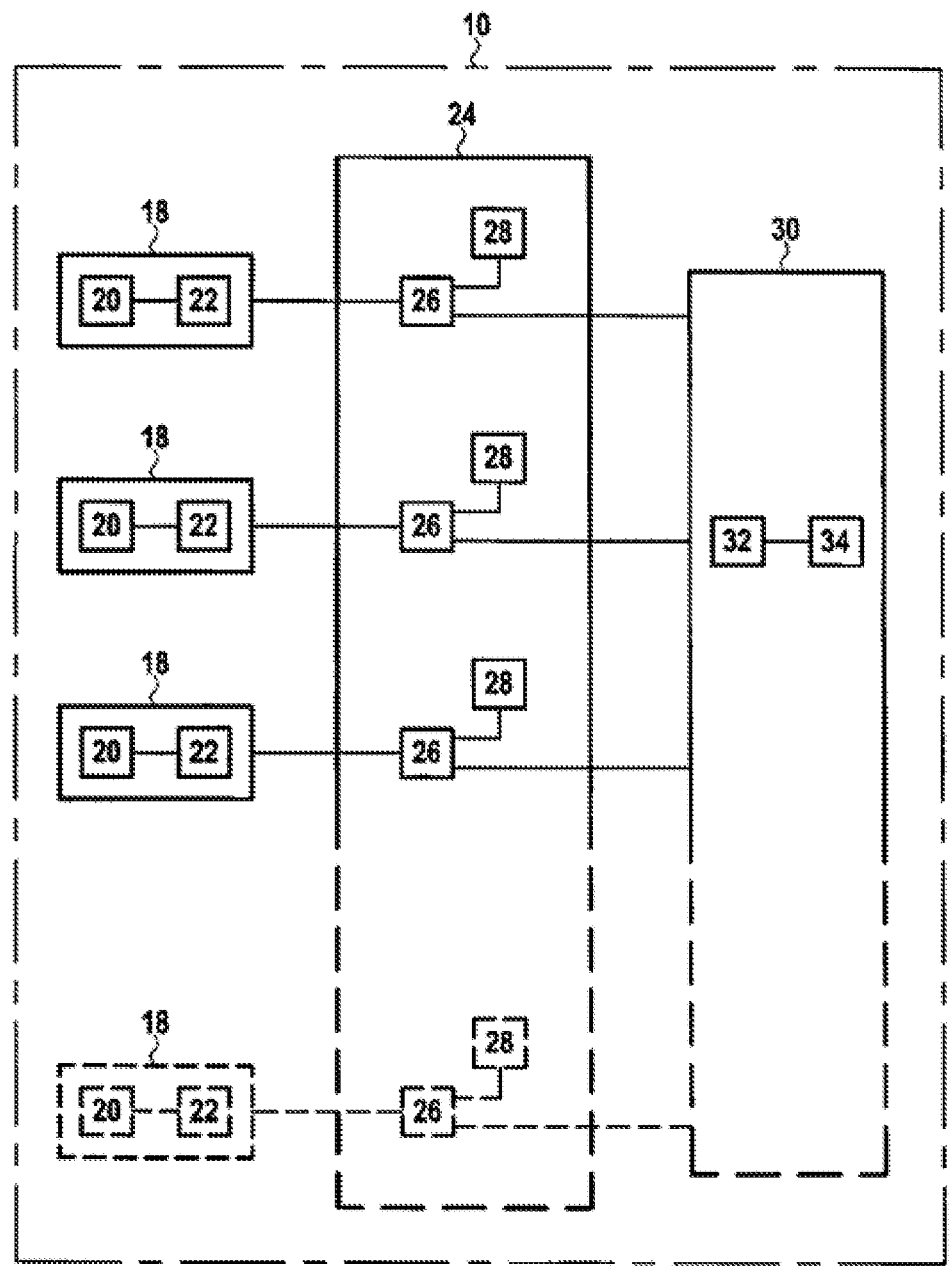
FIG. 2 is a simplified representation of the device in FIG. 1.

FIG. 2 shows in a simplified manner the device 10 in FIG. 1.

The device 10 comprises a plurality of connectors 18. Each connector 18 is configured to connect an ink reservoir 16 to the device 10. Each connector 18 comprises an inlet shutter 20 that can assume an open configuration or a closed configuration of the connector 18.

In the embodiment in FIG. 2, three connectors 18 are shown in solid lines. However, as suggested by the fourth connector 18 shown in dotted lines, the device 10 can comprise a different number of connectors 18, so long as the number of connector is greater than or equal to two.

In the embodiment in FIG. 2, each inlet shutter 20 comprises an actuator 22 of the inlet shutter 20, so that the inlet shutter 20 passes automatically from the closed configuration to the open configuration of the connector 18 when the connection of the ink reservoir 16 with the connector 18 and the inlet shutter 20 passes automatically from the open configuration to the closed configuration of the connector 18 on disconnection of the ink reservoir 16 from the connector 18.

It will be understood that the passage from the open configuration to the closed configuration of the connector, and vice versa, can be accomplished by the user.

The connectors 18 are in fluid communication with a metering system 24, which means that a fluid can flow from the connectors 18 to the metering system 24. The metering system 24 can also act directly on the connector 18 to draw a volume of ink from the ink reservoir 16.

In the embodiment in FIG. 2, the metering system 24 comprises a metering element 26 for each ink reservoir 16, which means that each connector 18 is fluidly connected to a metering element 26. The metering element 26 can for example be a piston with an actuator, a piezoelectric injection head, a thermal injection head or a solenoid valve.

The metering system 24 is configured to draw a volume of ink from each ink reservoir 16 connected to the device 10. It will be understood that the metering system 24 might not draw a volume of ink from all of the ink reservoirs 16 connected to the device 10, which means that at least one of the volumes of ink drawn off may be equal to zero.

FIG. 2 also shows one controller 28 for each metering element 26. It may also be envisaged that the metering system might comprise one controller 26 to control all of the metering elements 26 of the metering system 24.

The metering element 26 may for example be a piston with an actuator, a piezoelectric injection head, a thermal injection head or a solenoid valve.

The metering system 24 is in fluid communication with a filling system 30, which means that a fluid can flow from the metering system 24 to the filling system 30.

The filling system 30 is configured so as to fill the cartridge 14 with the volumes of ink drawn from the ink reservoirs 16 by the metering system 24. The mixing of inks is thus performed directly in the cartridge 14. It is not therefore necessary to rinse the device 10 if one wishes to fill a cartridge with a different mixture of inks.

In the embodiment in FIG. 2, the filling system 30 comprises an outlet shutter 32 that can assume an open configuration or a closed configuration of the filling system 30.

In the embodiment in FIG. 2, the device 10 comprises an actuator 34 of the outlet shutter 32, so that the outlet shutter 32 passes automatically from the closed configuration to the open configuration of the filling system 30 on connection of a cartridge 14 to the filling system 30 and the outlet shutter 32 passes automatically from the open configuration to the closed configuration of the filling system on disconnection of a cartridge 14 from the filling system 30.

It will be understood that the passage from the open configuration to the closed configuration of the filling system, and vice versa, can be accomplished by the user.

The empty cartridge 14 that is filled with a mixture of inks may have a volume greater than or equal to 0.50 mL, preferably greater than or equal to 0.75 mL and less than or equal to 5 mL, preferably less than or equal to 3 mL.

Inks can be aqueous inks, that is to say inks of which the solvent is water.

When the inlet shutters 20 and the outlet shutter 32 are in the open configuration and the ink reservoirs 16 and cartridge 14 are connected to the device 10, the ink reservoirs 16 are connected to the cartridge, which means that the ink contained in the reservoirs 16 can flow to the cartridge 14.

The method for filling the cartridge 14 using the device 10 will now be described.

In the embodiment in FIG. 1, the device 10 is shown with a cartridge 14 connected to the device 10, in particular to the filling system 30 of the device 10. Moreover, four ink reservoirs 16 are connected to the connectors 18 of the device 10. It will be understood that the number of reservoirs 16 is given by way of non-limiting example.

The metering system 24 draws a volume of ink from each ink reservoir 16 connected to the device 10. It will be understood that the metering system 24 cannot draw a volume of ink from all of the ink reservoirs 16 connected to the device 10, which means that at least one of the volumes of ink drawn may be equal to zero.

The volumes of ink drawn off are sent into the filling system 30 of the device 10 so that the cartridge 14 is filled with the mixture of inks.

Figure 3:
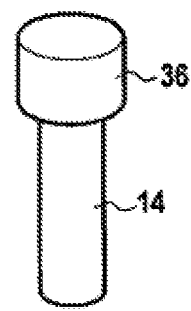
FIG. 3 is a perspective view of a cartridge and a cap according to an example.

The user can then disconnect the cartridge 14 from the device 10 and insert the cartridge 14 into the writing implement. The user can also fit a cap 36 onto the cartridge 14 in order to prevent the evaporation of the mixture of inks contained in the cartridge 14, as is shown in FIG. 3.

The cap 36 can be fitted to the cartridge 14 by cooperation of the internal surfaces of the cap 36 with an external surface of the cartridge 14, or vice versa.

When the user wishes to change the color of ink in the writing implement, the user can remove the cartridge 14 containing a first mixture of inks and insert a new cartridge containing a second mixture of inks. The user can retain the cartridge 14 containing the first mixture of inks and fit a cap 36 onto it in order to seal the cartridge 14 and prevent or reduce the evaporation of the first mixture of inks.

For example, by taking a device 10 comprising two connectors 18 and thus two ink reservoirs 16 of different shades or colors, by mixing the inks contained in the two ink reservoirs 16 connected to the connectors 18 in different proportions, that is to say by drawing off, thanks to the metering system 24, different volumes of the two inks, it is possible to obtain mixtures of inks having different colors.

Depending on the number of ink reservoirs and the color and saturation of each ink, it is thus possible to create different mixtures of inks by modifying the proportion of each ink drawn from each reservoir.

The user can thus quickly obtain a cartridge filled with a mixture of inks.

Although the present disclosure has been described with reference to a specific embodiment, clearly different modifications and changes can be made to these embodiments without departing from the general scope as defined by the claims. Furthermore, individual characteristics of the different embodiments described can be combined in additional embodiments. Consequently, the description and the drawings must be considered in an illustrative rather than a restrictive sense.

The invention claimed is:

1. A device for filling cartridges for a writing implement, the device comprising:
   a first connector;
   a second connector;
   a metering system for metering inks; and
   a filling system for filling a cartridge, wherein:
      the first connector is configured to connect a first reservoir containing a first ink to the cartridge,
      the second connector is configured to connect a second reservoir containing a second ink to the cartridge,
      the metering system is configured to draw the first ink from the first reservoir,
      the metering system is configured to draw the second ink from the second reservoir, and
      the filling system is configured to fill the cartridge with the first ink and the second ink;
   wherein the first connector comprises:
   an inlet shutter configured to assume an open configuration or a closed configuration; and
   an actuator configured to:
      automatically change the inlet shutter from the closed configuration to the open configuration when the first reservoir is connected to the first connector, and
      automatically change the inlet shutter from the open configuration to the closed configuration when the first reservoir is disconnected from the first connector.

2. The device according to claim 1, wherein the metering system comprises a first metering element for the first ink reservoir and a second metering element for the second ink reservoir.

3. The device according to claim 1, further comprising a third connector.

4. The device according to claim 1, wherein the filling system comprises:
   an outlet shutter configured to assume an open configuration or a closed configuration; and
   an actuator configured to:
   automatically change the outlet shutter from the closed configuration to the open configuration when a cartridge is connected to the filling system, and
   automatically change the outlet shutter from the open configuration to the closed configuration when the cartridge is disconnected from the filling system.

5. An assembly comprising:
the device according to claim 1; and wherein the device is configured to receive the cartridge when it is removed from a writing implement, the cartridge having a volume greater than or equal to 0.50 mL and less than or equal to 5 mL, wherein the cartridge is configured to be inserted in the writing implement.

6. An assembly comprising:
the device according to claim 1;
the first ink reservoir connected to the first connector; and
the second ink reservoir connected to the second connector.

7. The assembly according to claim 6, wherein the first ink has a first color and the second ink has a second color.

8. The assembly according to claim 6, further comprising the cartridge, wherein the cartridge is configured to be attached to and removed from a writing implement, and wherein the cartridge filling device is configured to receive the cartridge when removed from the writing implement.

9. The assembly according to claim 6, wherein the first and second inks comprise a dye and a solvent and have viscosities close to 1 mPA·s (millipascal second).

10. A method for filling a cartridge for a writing implement in an assembly according to claim 6, the method comprising the following steps:
using the metering system to draw off a first volume of the first ink from the first reservoir and a second volume of the second ink from the second reservoir;
filling a cartridge with the first and second volumes of ink drawn off by the metering; and
attaching the cartridge to the writing implement.

11. A method according to claim 10, wherein, after filling the cartridge, the method comprises the step of fitting a cap onto the cartridge in order to seal the cartridge.

12. The method of claim 10, further comprising transmitting a mechanical vibration to the cartridge.

13. The method of claim 10, further comprising:
automatically opening, via an actuator, the first connector upon the first connector being connected to the first reservoir; and
automatically closing, via the actuator, the first connector upon the first connector being disconnected from the first reservoir.

14. The method of claim 10, further comprising removing the cartridge from the writing implement for storage.

15. The method of claim 14, further comprising, after removing the cartridge, fitting a cap onto the cartridge in order to seal the cartridge.

16. A device for filling cartridges for a writing implement, the device comprising:
a first connector;
a second connector;
a metering system for metering inks; and
a filling system for filling a cartridge, wherein:
the first connector is configured to connect a first reservoir containing a first ink to the cartridge,
the second connector is configured to connect a second reservoir containing a second ink to the cartridge,
the metering system is configured to draw the first ink from the first reservoir,
the metering system is configured to draw the second ink from the second reservoir, and
the filling system is configured to fill the cartridge with the first ink and the second ink;
wherein the filling system comprises:
an outlet shutter configured to assume an open configuration or a closed configuration; and
an actuator configured to:
automatically change the outlet shutter from the closed configuration to the open configuration when a cartridge is connected to the filling system, and
automatically change the outlet shutter from the open configuration to the closed configuration when the cartridge is disconnected from the filling system.

17. A method for filling a cartridge for a writing implement in an assembly, wherein the assembly includes a device for filling cartridges for a writing implement, the device comprising: a first connector; a second connector; a metering system for metering inks; and a filling system for filling a cartridge, wherein:
the first connector is configured to connect a first reservoir containing a first ink to the cartridge, the second connector is configured to connect a second reservoir containing a second ink to the cartridge, the metering system is configured to draw the first ink from the first reservoir, the metering system is configured to draw the second ink from the second reservoir, and the filling system is configured to fill the cartridge with the first ink and the second ink, the first ink reservoir connected to the first connector; and the second ink reservoir connected to the second connector the method comprising:
using the metering system to draw off a first volume of the first ink from the first reservoir and a second volume of the second ink from the second reservoir;
filling a cartridge with the first and second volumes of ink drawn off by the metering;
attaching the cartridge to the writing implement;
automatically opening, via an actuator, the filling system upon the cartridge being connected to the filling system; and
automatically closing, via the actuator, the filling system upon the cartridge being disconnected from the filling system.

\* \* \* \* \*

UNITED STATES PATENT AND TRADEMARK OFFICE
CERTIFICATE OF CORRECTION

PATENT NO. : 11,660,904 B2
APPLICATION NO. : 16/652743
DATED : May 30, 2023
INVENTOR(S) : Franck Rolion and Etienne Roudaut It is certified that error appears in the above-identified patent and that said Letters Patent is hereby corrected as shown below:

In the Claims

In Claim 17, Column 8, Line 39, please delete "second connector" and insert --second connector,"--.

Signed and Sealed this
First Day of August, 2023

*Katherine Kelly Vidal*

Katherine Kelly Vidal
*Director of the United States Patent and Trademark Office*